US008076609B2

(12) United States Patent
Oberg

(10) Patent No.: US 8,076,609 B2
(45) Date of Patent: Dec. 13, 2011

(54) APPARATUS AND METHOD FOR MACHINING TUBING

(75) Inventor: Troy Oberg, Grove City, MN (US)

(73) Assignee: Troy Oberg, Grove City, MN (US)

( * ) Notice: Subject to any disclaimer, the term of this patent is extended or adjusted under 35 U.S.C. 154(b) by 815 days.

(21) Appl. No.: 11/982,014

(22) Filed: Nov. 1, 2007

(65) Prior Publication Data

US 2009/0114626 A1    May 7, 2009

(51) Int. Cl.
*B23K 26/38* (2006.01)
(52) U.S. Cl. .............................. 219/121.67; 219/121.82
(58) Field of Classification Search ........... 219/121.67–121.72, 121.82; 29/6.1, 29/557; 216/56
See application file for complete search history.

(56) References Cited

U.S. PATENT DOCUMENTS

| | | | | |
|---|---|---|---|---|
| 2,413,016 | A * | 12/1946 | Wiken et al. ..................... | 83/169 |
| 2,788,618 | A * | 4/1957 | Meyrick ......................... | 451/160 |
| 3,467,450 | A * | 9/1969 | Schmidt et al. ................ | 384/447 |
| 4,078,165 | A * | 3/1978 | Tuttle ........................ | 219/121.84 |
| 4,911,160 | A * | 3/1990 | Thyzel .............................. | 606/4 |
| 5,628,327 | A * | 5/1997 | Unger et al. .................. | 600/562 |
| 5,756,953 | A * | 5/1998 | Lehmann .................... | 219/69.12 |
| 5,852,277 | A * | 12/1998 | Gustafson ................ | 219/121.67 |
| 5,855,802 | A * | 1/1999 | Acciai et al. ....................... | 216/8 |
| 6,114,653 | A | 9/2000 | Gustafson | |
| 6,261,310 | B1 * | 7/2001 | Neuberger et al. ............. | 607/89 |
| 6,783,013 | B1 * | 8/2004 | Spann .......................... | 211/70.6 |
| 6,914,251 | B1 * | 7/2005 | Weed et al. ................ | 250/491.1 |
| 7,038,334 | B2 * | 5/2006 | Botos et al. ................ | 310/12.06 |
| 7,322,716 | B1 * | 1/2008 | Atkinson et al. ............. | 362/198 |
| 2003/0234242 | A1 * | 12/2003 | McCoy .................... | 219/121.67 |
| 2006/0276116 | A1 * | 12/2006 | Reich et al. .................... | 451/453 |

OTHER PUBLICATIONS

'Noble Stent Cutter' Demonstration, Two Still Shots from Video Broadcast of "The News Hour with Jim Lehrer"., (Mar. 6, 2001), 1 pg.
"Tooling Drawings", (prior to Nov. 1, 2007), 6 pgs.

* cited by examiner

*Primary Examiner* — Samuel M Heinrich
(74) *Attorney, Agent, or Firm* — Schwegman, Lundberg & Woessner, P.A.

(57) ABSTRACT

An apparatus for machining tubing includes a weighted base, an upright frame attached to the weighted base, and a laser light source attached to the weighted base. The apparatus also includes a guide bushing tooling attached to the upright frame which holds a guide bushing. A rotary drive bushing is aligned with the guide bushing holder. An optical assembly for focusing the laser light to a laser beam spot is also attached to the guide bushing tooling block. Spacer plates may be used to correctly space the optical assembly from the tubing material.

26 Claims, 9 Drawing Sheets

APPARATUS AND METHOD FOR MACHINING TUBING

TECHNICAL FIELD

Various embodiments described herein relate to apparatus, systems, and methods associated with for machining tubing.

BACKGROUND INFORMATION

Some applications require the machining of a hollow tubing material. In still other instances, the hollow tubing material may also be expensive or costly. For example, high cost stainless steel material that is biocompatible and will stay in the body without corroding is used in some applications. For example, small cylindrical tubes called stents may be inserted into the artery after a coronary angioplasty procedure. A stent prevents a coronary artery from closing again after a coronary angioplasty procedure. A coronary angioplasty is a medical procedure used to treat blocked coronary arteries as an alternative to a coronary bypass operation. It involves the insertion of a balloon catheter into the blocked artery and the inflation of the balloon to expand the size of the artery and relieve the blockage. A stent is placed in the coronary artery to prevent the need to repeat the angioplasty procedure. Of course, repeating the coronary angioplasty is not only unpleasant for the patient, but also places the patient at risk and is expensive. Therefore, a stent is used so as to prevent the need or lengthen the time between coronary angioplasty procedures for the patient.

Stents are made of a thin-walled metallic material and have a pattern of apertures or holes cut around the circumference of the stent, which continue along most of its length. In the coronary application, the stent reinforces the walls of the coronary artery after an angioplasty procedure. The pattern in a stent is typically cut by a laser cutting tool. The most common use of stents is in coronary arteries. However, stents are also widely used in other tubular structures, such as central and peripheral arteries and veins, bile ducts, esophagus, colon, trachea or large bronchi, and urethra. Stents are even used in the brain in some procedures. In other applications, plastic surgeons use stents for reconstructive surgery.

In manufacturing stents, basic lathe techniques have been adapted to support the tubing used to form the stent during the hole cutting process. Typically, a piece of tubing is supported between a drive mechanism and a tail stock support in the manner of a lathe. A laser cutting tool positioned above the tubing will cut the pattern by moving relative to the tubing along the length of the finished stent, the tubing being rotated as necessary to present different parts of the circumference to the laser cutting tool. After the first end and subsequent patterns are completely cut in the stent, the tubing is cut at the drive end of the stent to allow a finished stent to be completed. The completed stent is then projected toward a hard-walled catch basin by a jet of water or similar fluid. In some instances, the stent is bent or otherwise deformed as a result of hitting the catch basin.

Current manufacturing methods have other various limitations which result in a fairly high scrap rate. The current manufacturing methods also may require lengthy times for retooling or adjusting the current tooling when another type or diameter of tubing is going to be cut or formed into a finished stent. Therefore, there is a need for an apparatus and method for machining tubing that is in need of little or no adjustment and which produces less waste than current methods.

BRIEF DESCRIPTION OF THE DRAWINGS

The invention is pointed out with particularity in the appended claims. However, a more complete understanding of the present invention may be derived by referring to the detailed description when considered in connection with the figures, wherein like reference numbers refer to similar items throughout the figures and:

DETAILED DESCRIPTION

Figure 1:
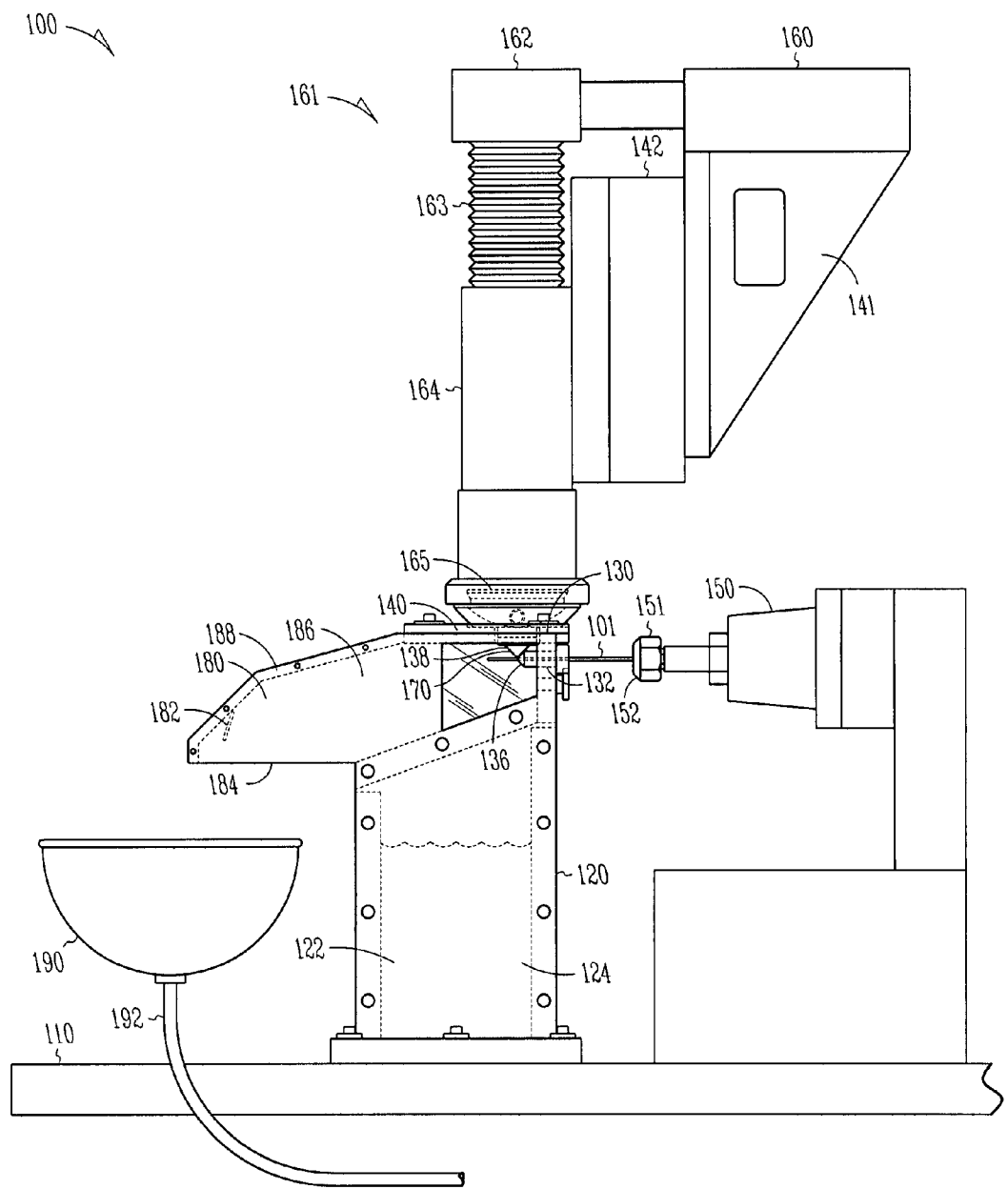
FIG. 1 is a side view of a tubing machining apparatus, according to an example embodiment of the invention.

FIG. 1 is a side view of a tubing machining apparatus 100, according to an example embodiment of the invention. An apparatus 100 for machining tubing material 101 includes a weighted base 110, an upright frame 120 attached to the weighted base 110, and a laser light source 160, which is attached to the weighted base 110 at multiple locations, some of which are not shown in this application. The machining apparatus 100 also includes a gusset 141 and a linear translation stage 142, which has a set of gear teeth. The laser light source 160 is attached to the weighted base 110 by means of another set of frames (not illustrated herein and are somewhat beyond the scope of this invention), and is also attached to the weighted base 110 through said apparatus 100 as shown. The apparatus 100 also includes a main or guide bushing tooling 130 attached to the upright frame 120, which holds a guide bushing 132 and the main or guide bushing tooling block 130. A rotary drive bushing 150 is aligned with the guide bushing tooling 130 that holds the guide bushing 132. An optical assembly 161 for focusing the laser light or collimated light to a laser beam spot 170 is attached to the main or guide bushing tooling block 130.

In some embodiments, the upright frame 120 includes a cavity 122 adapted to receive additional material for weighting the upright frame member. The additional material 124 can be a dense liquid, such as oil or water. In this case, the cavity would have to be liquid tight so as to contain the material. The additional material 124 could also be a dense material, such as sand. The additional material can be any other material or a dense material. The additional material 124 adds weight and mass to the upright 120 and absorbs vibrations caused by the various parts of the apparatus 100. The additional material 124 also dampens vibrations from the various portions of the apparatus 100. A larger mass or weight will generally vibrate at a lower frequency than the same object having a lesser weight.

The guide bushing 132 is substantially flush with respect to the right side of the upright 120 and the bushing tooling 130. In other words, there is no overhang near the end of the guide bushing 132 that would prevent the rotary guide bushing assembly from being closely positioned with respect to the guide bushing 132. As a result, the tubing material 101 can be more fully supported between the guide bushing 132 and the rotary guide bushing assembly 150. The rotary guide bushing assembly 150 includes a retaining nut 151 that holds the rotary guide bushing assembly 150 together. The nut 151 includes a chamfered end 152 that allows the rotary guide bushing assembly 150 to become closely spaced to the guide bushing 132. As a result, the rotary drive bushing assembly 150 can be positioned substantially adjacent the guide bushing 132 while supporting a tubing material 101. As a result, the rotary drive bushing assembly 150 and associated tooling can come up substantially all the way to the guide bushing. This allows greater support of the tubing material 101 during manufacture or cutting of the tubing material 101.

In addition, more tubing material 101 can be utilized since the rotary guide bushing assembly 150 is able to be positioned more closely to the guide bushing 132. The tubing material 101 used is generally some type of biocompatible stainless steel and is therefore very expensive. In many instances, the tubing comes in desired lengths. One common length is two feet. Since the rotary drive bushing 150 can come substantially all the way to the guide bushing 132, the machinist can produce more parts from a given length of tubing material 101. The savings or extra profit can be hundreds of dollars per day per apparatus 100 for machining the tubing material 101. Of course, the more apparatus 100 a company has running, the larger the savings or additional profit will be.

In addition, there is more room to mount a linear translation stage that is used to move the rotary guide bushing assembly 150, since the rotary guide bushing assembly 150 is able to be positioned more closely to the guide bushing 132.

In addition, apparatus 100 is able to hold tighter tolerances due to the fact that extruded tubing material 101 expands upon the removal of sections of the tubing material. Because the rotary guide bushing 132 has a chamfered end 136, and because of the designed position of the bushing block 130, the guide bushing 132 is able to be positioned much closer to the cutting area and to the laser beam spot 170, which allows the tubing material 101 to be cut into smaller sections than in previous designs. By dividing the patterns to be cut or removed from the tubing material 101 into smaller cross sectional areas during the cutting process, the expansion effect of the tubing plays a greatly diminished roll in the final dimensions of the manufactured part. This allows for tighter tolerances to be achieved in the production process.

An optical assembly 161 is used to focus and reposition the collimated light from the laser source 160 to a laser cutting spot 170 on the outside perimeter of the tubing material 101. The optical assembly 161 includes an optical mirror assembly 162, a bellows 163, a support column 164, a translatable stage 142, and a focusing optic set 165. The optical mirror assembly 162 turns the collimated light from the laser light source 160 so that it travels vertically through the bellows 163 and a hollow portion of the support column 164 to the focusing optic set 165 within the hollow portion of the support column 164. The focusing optic set 165 focuses the collimated light to produce the laser cutting spot 170. The laser cutting spot 170 is positioned at or near the outer periphery of the tubing material 101. The laser cutting spot 170 is positioned so that it will cut the tubing material 101. The optical mirror 162 can be adjusted so as to move the laser cutting spot 170 and position it within the aperture of the gas jet tip 138. The optical assembly 161 also includes a mating plate 140. The mating plate 140 mates with the main or guide bushing tooling 130. The mating plate is fastened to the main or guide bushing tooling 130 and fastened to the optical assembly 161. A set of guide pins is used to maintain alignment of the mating plate during the assembly and between disassembly and reassembly of the mating plate 140 and the main or guide bushing tooling 130. Once the optical assembly 161 and the main or guide bushing tooling 130 are attached via the mating plate 140, these two items are tied together and are attached to the weighted base 110 at two places.

In some embodiments, the optical assembly 161 can be moved to accommodate different diameters of tubing material 101. A spacer plate (shown in FIG. 4) can then be used to reposition the focused laser cutting spot to the correct distance from the tubing material 101 by spacing the focusing optical set 165 and the gas jet tip 138 to an appropriate distance from the tubing material 101. As shown in FIG. 1, there is no spacer plate (shown in FIG. 4) since the apparatus is set up for the minimum spacing and for a minimum diameter of tubing material 101.

In one embodiment, the left edge of the guide bushing 132 (as viewed from FIG. 1) is positioned at a distance of 0.025" from the focused laser cutting spot. In another embodiment, the left edge of the guide bushing 132 (as viewed from FIG. 1) is positioned at a distance of 0.050" from the focused laser cutting spot. In still another embodiment, the left edge of the guide bushing 132 (as viewed from FIG. 1) is positioned at a distance of 0.080" from the focused laser cutting spot. Apparatus 100 allows for a closer positioning of a standard length of guide bushing 132 to the laser focused spot 170 or cutting area than previous inventions. Precise distancing of the guide bushing 132 to the focused laser cutting spot 170 is critical in maintaining maximum tubing support during machining. The exact desired distance to be used between the guide bushing 132 and the focused laser spot 170 is determined by multiple factors, some of which may include; the design of tubular patterns being cut, the diameter and material of the tubing being cut, the tolerances required for a particular production run and the coaxial distance of cross-sectional areas that was used in the motion control program. Changing the distance between the guide bushing 132 and the focused laser spot 170 can be achieved by varying the shaft length of guide bushing 132, or more simply by sliding a pre-made washer or washers of a pre-designed thickness over the shaft of the guide bushing 132 before inserting guide bushing 132 into the guide bushing tooling block 130. Since apparatus 100 allows for greater control of and closer spacing between the guide bushing 132 and the focused laser spot 170 than previous inventions, apparatus 100 is able to cut tubular parts more accurately, resulting in higher achievable tolerances in production and a higher yield of product.

The apparatus 100 also includes an ejection box 180 attached to the upright frame 120. The ejection box 180 is adapted to deflect and or catch manufactured parts, whichever the application may require. In other words, the ejection box 180 deflects portions of tubing material 101 that have been machined into manufactured parts, such as a completed stent. Water is used to cool the tubing material 101 while it is being cut with the focused laser at the laser cutting spot 170. The water also prevents the laser beam itself and sparks produced from the laser cutting of the tubing material 101 from burning the inside of the tubing material 101 during cutting. When the cutting is complete, the completed part is cut from the length of tubing material 101. This releases the finished part from the main section of tubing 101. Guide bushing 132 and rotary drive bushing 150 hold the remaining portion of the tubing 101. The water used in cooling carries the part into the ejection box 180. As shown in FIG. 1, finished part 182 is shown in mid air during its flight in the ejection box 180. A gas may be used for aiding in cutting and to provide an appropriate environment during the manufacture of the completed part. Typically, the cutting spot 170 is bathed in oxygen gas to enable the cutting of the tubing material 101.

The ejection box 180 includes sides having straight walls 186 and a top having a series of inclined surfaces, such as inclined surface 188. When the completed part is projected into the inclined side 188, it is less likely to be damaged. In another embodiment, the ejection box 180 includes a substantially curved surface so as to lessen impact forces or shock loads that would occur if the part was projected into a substantially vertical surface. In one embodiment, the inclined top can be made of a clear material so that the operator of the apparatus 100 can inspect the manufacturing process as it is happening. The clear material can be treated so that it filters out light associated with the laser. This is helpful in the event that there is an apparatus 100 that needs to be inspected. For example, if one apparatus 100 is producing a higher number of rejected parts than another apparatus, the operator may inspect the laser cutting operation and the ejection operation in real time as it is cutting to gather helpful information and data that may provide helpful to the manufacturing process. In one embodiment, the filtering material of the ejection box blocks light having a wavelength of 1064 nanometers (nm). Such a filter is for the safety of the machine operators and is for the safety of any other observers. The ejection box 180 also includes sidewalls, such as a sidewall 186. The sidewalls of the ejection box, such as sidewall 186, as shown in FIGS. 1, 2 and 3 are metal so as to provide a more vibration free apparatus that can be used to more accurately cut or machine tubing material 101.

The apparatus 100 also includes a bin 190 positioned below the ejection box 180. The ejection box 180 has an open bottom 184 through which the manufactured part 182 will fall or pass through enroute to the bin 190. The bin 190 may also be attached to the weighted base 110. The bin 190 may also include a basin and drain 192 for catching water or any other liquid used for cooling the tubing material 101 during the laser cutting operation. The water or other cooling fluid can be filtered and recycled back into the system for cooling the subsequent cutting of other tubing material.

Figure 2:
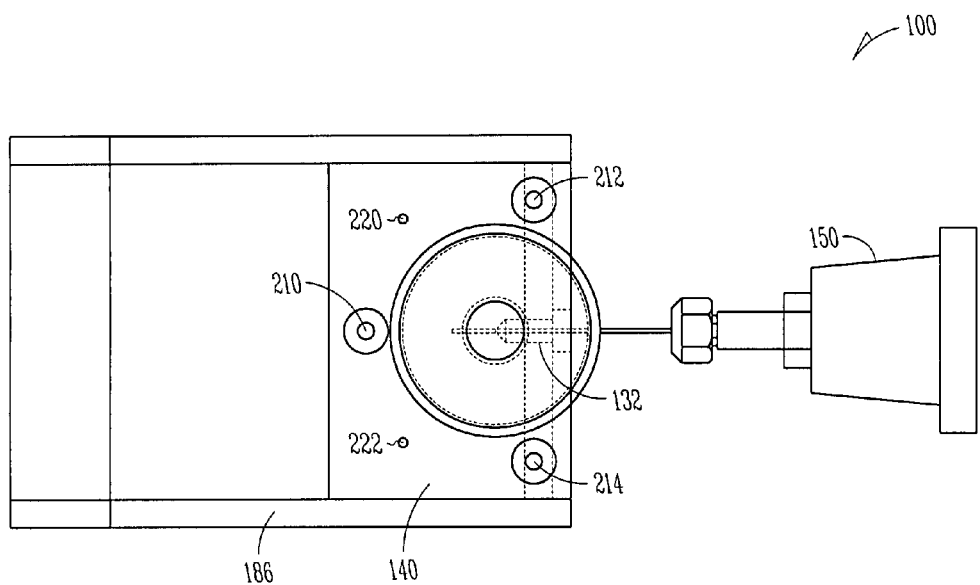
FIG. 2 is a top view of the tubing machining apparatus shown in FIG. 1, according to an example embodiment of the invention.

FIG. 2 is a top view of a portion of the tubing machining apparatus 100 shown in FIG. 1, according to an example embodiment of the invention. FIG. 3 is a front view of the tubing machining apparatus 100 shown in FIG. 1, according to an example embodiment of the invention. Referring now to both FIGS. 2 and 3, further details of the apparatus for machining tubing 100 will be discussed. FIG. 2 shows a top view of the guide bushing tooling block 130, the guide bushing 132, the rotary driver bushing 150, and a mating plate 140. A mating plate 140 mates with the main or guide bushing tooling block 130. The mating plate is fastened to the main or guide bushing tooling block 130 and fastened to the optical assembly 161. A set of guide pins is used to maintain alignment of the mating plate during the assembly and between disassembly and reassembly of the mating plate and the main or guide bushing tooling block 130. Once the optical assembly 161 and the main or guide bushing tooling block 130 are attached via the mating plate 140, these two items are tied together and are each attached to the weighted base 110 at two places.

Figure 3:
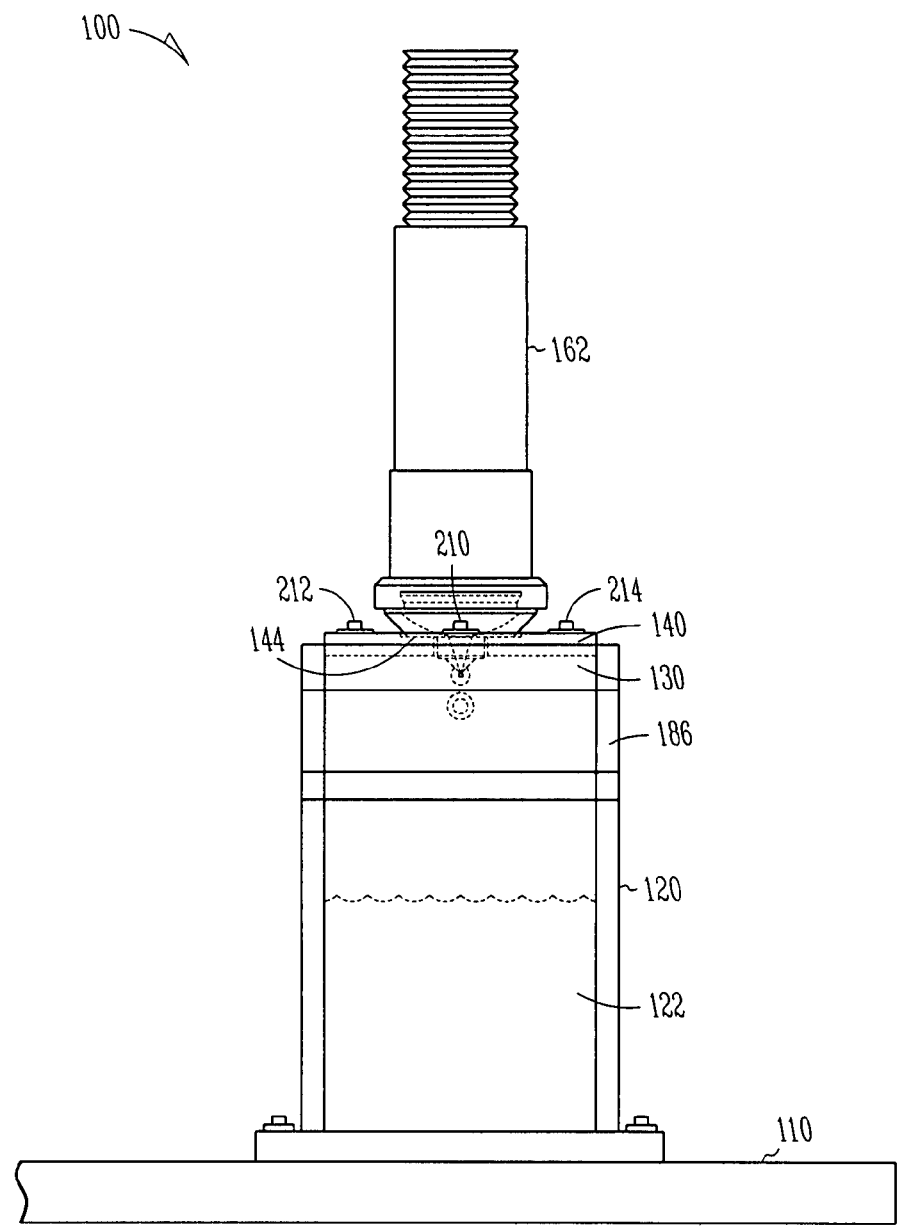
FIG. 3 is a front view of the tubing machining apparatus shown in FIG. 1, according to an example embodiment of the invention.

FIG. 3 is a front view of the tubing machining apparatus 100 shown in FIG. 1, according to an example embodiment of the invention. The mating plate 140 includes a recess 144. The recess 144 allows for a thicker standard thickness of mating plate 140 to be used in the general design, which adds greater overall system stability, yet still allows the gas jet tip 138 and the focused laser spot 170 to be close enough to the center point of the guide bushing 132, which allows apparatus 100 to machine any reasonable minimum diameter of tubing. When mating plate 140 is separated from tooling block 130, there is an opening of machined flat surfaces which allows for the insertion of spacer plate 200, or a second spacer plate (not shown). The first spacer plate is used to position the optical assembly 161 with respect to the first diameter of tubing. Another spacer plate (not shown), such as a second spacer plate, is used to position the optical assembly 161 with respect to a second diameter of tubing material 101. The spacer plates, such as spacer plate 200, are used to move the optical assembly 161 and the laser cutting spot 170 to a position where the laser can cut the respective diameter of tubing material 101.

The mating plate 140 may be attached to the main or guide bushing tool block 130 by way of fasteners 210, 212, 214 (shown in both FIGS. 2 and 3). The main or guide bushing tool block 130 is, in turn, attached to the upright frame 120, which is attached to the weighted base 110. The mating plate 140 also is attached to the optical assembly 161. The mating plate 140 includes dowel openings 220, 222 for connecting to the main or guide bushing tooling block 130. Thus, the optical assembly 161, which some also term as a beam delivery mechanism, is attached to the weighted base 110 through the main or guide bushing tooling block 130, and is also attached to the weighted base 110 through a set of frame members (not shown herein and somewhat beyond the scope of this application), which support the beam delivery gusset 141 and the laser source 160. These connections provide for a much more stable system of apparatus 100 for machining or cutting the tubing material 101 since all or most of the major components are attached to the weighted block 110 either directly or indirectly. This lessens the occurrence of vibration in the apparatus 100. In addition, the pinned system greatly improves reliability and repeatability of the apparatus 100, and substantially eliminates or reduces the need for tedious alignments of the rotary bushing 150 to the guide bushing 132. By pinning the main or guide bushing tooling 130 and the mating plate 140 and the optical assembly 161 together, any drifting or misalignment of the main or guide bushing tooling 130 and the optical assembly 161 or beam delivery tooling by bumping, normal production vibrations, operator error, loose screws or any other forces that may cause misalignments will be substantially reduced or substantially eliminated.

In FIG. 3, the mating plate 140 is directly mounted to the main or guide bushing tooling 130. In FIG. 3, the apparatus 100 is set up for cutting tubing material 101 of the smallest diameter. In order to cut patterns or machine tubing having a larger diameter, a spacing plate 200 (shown in FIG. 4) is used to space the focusing optics 165 and all of the beam delivery components that are below the bellows 163 at an appropriate distance from the tubing material 101 to allow cutting of the tubing material 101.

Figure 4:
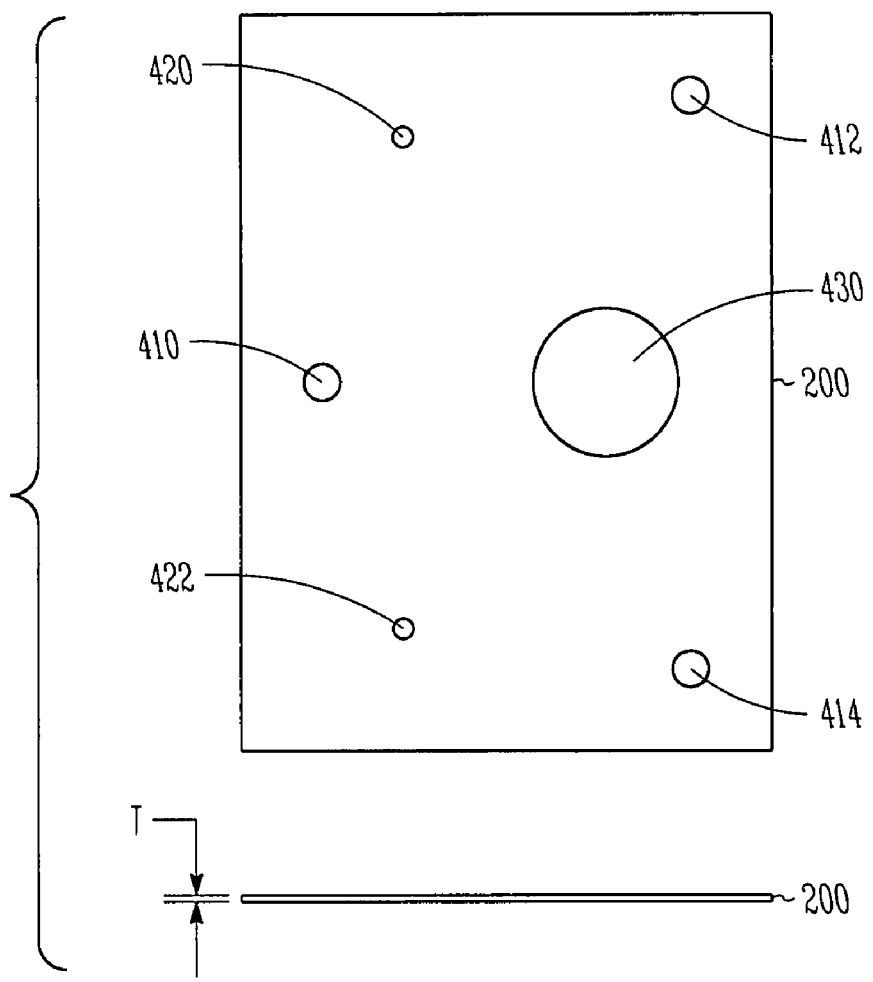
FIG. 4 is a top view and a side view of a spacer plate for a tubing machining apparatus, according to an example embodiment of the invention.

FIG. 4 is a top view and a side view of a spacer plate 200 for a tubing machining apparatus 100, according to an example embodiment of the invention. The spacer plate 200 is substantially rectangular in shape and includes openings 410, 412, 414 for the fasteners 210, 212, 214 (shown in FIGS. 2 and 3). The spacer plate 200 also includes openings 420 and 422 for the dowel pins. The spacer plate 200 also includes an opening 430 for the laser light. In one embodiment the opening 430 is sized for a gas jet. Also shown in FIG. 4 is the fact that the spacer plate 200 has a thickness T. The thickness T changes to move the optical assembly 161 or the beam delivery assembly with respect to the tubing being handled by the apparatus 100. The thickness of the spacer plates normally varies depending on the diameter of tubing to be cut. In addition, the material of spacer plate 200 may be made of but not limited to a hardened material such as tool steel or stainless steel or may be made from but not limited to a somewhat softer material such as hard rubber, which would act to further dampen unwanted vibrations in apparatus 100. With the advent of direct drive motion control and granite machine bases, (which is one possible material that weighted base 110 could be made of), apparatus 100 becomes an even more viable solution to reducing machining center vibrations.

Figure 5:
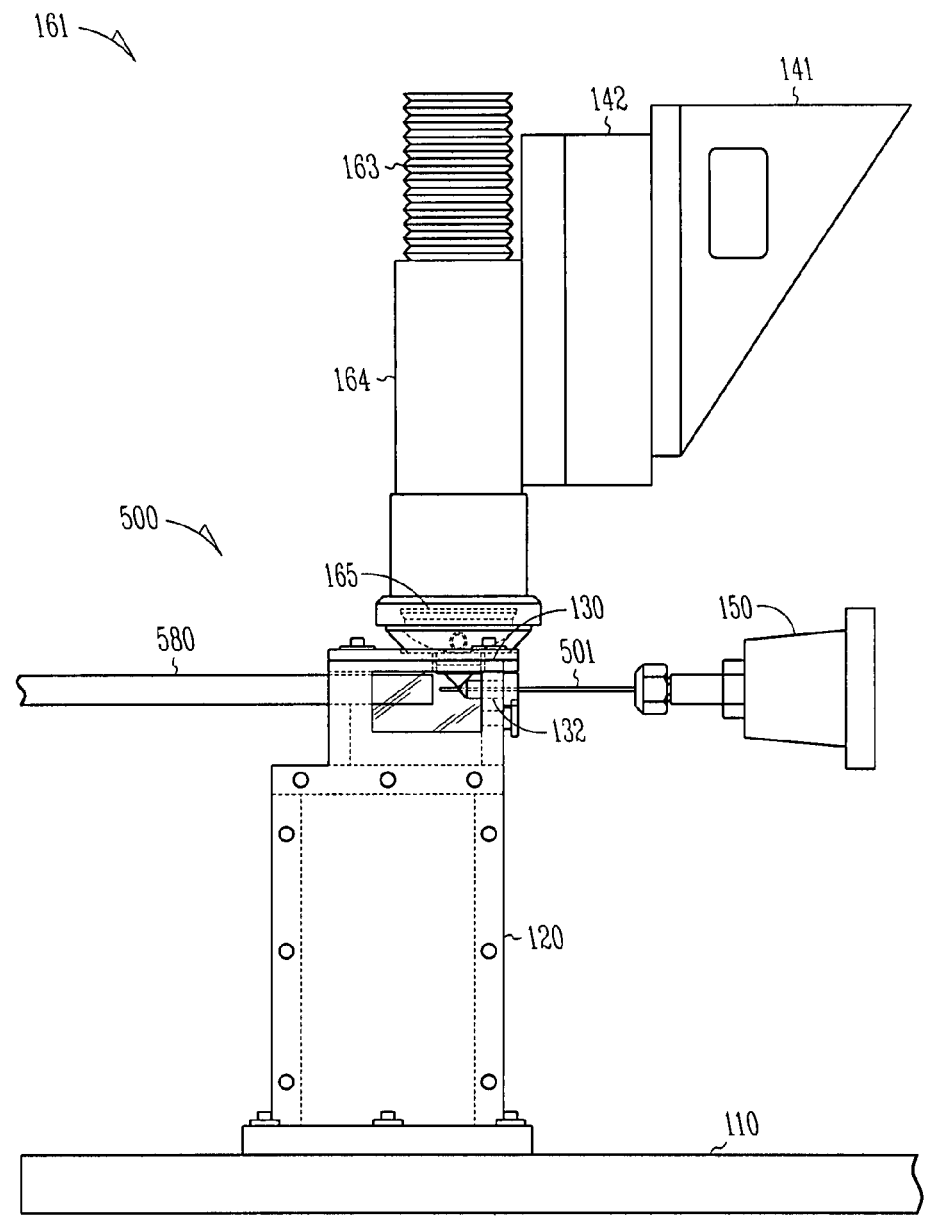
FIG. 5 is a side view of a tubing machining apparatus having the optical assembly or beam delivery system attached to the tooling block and the frame, according to an example embodiment of the invention.
Figure 6:
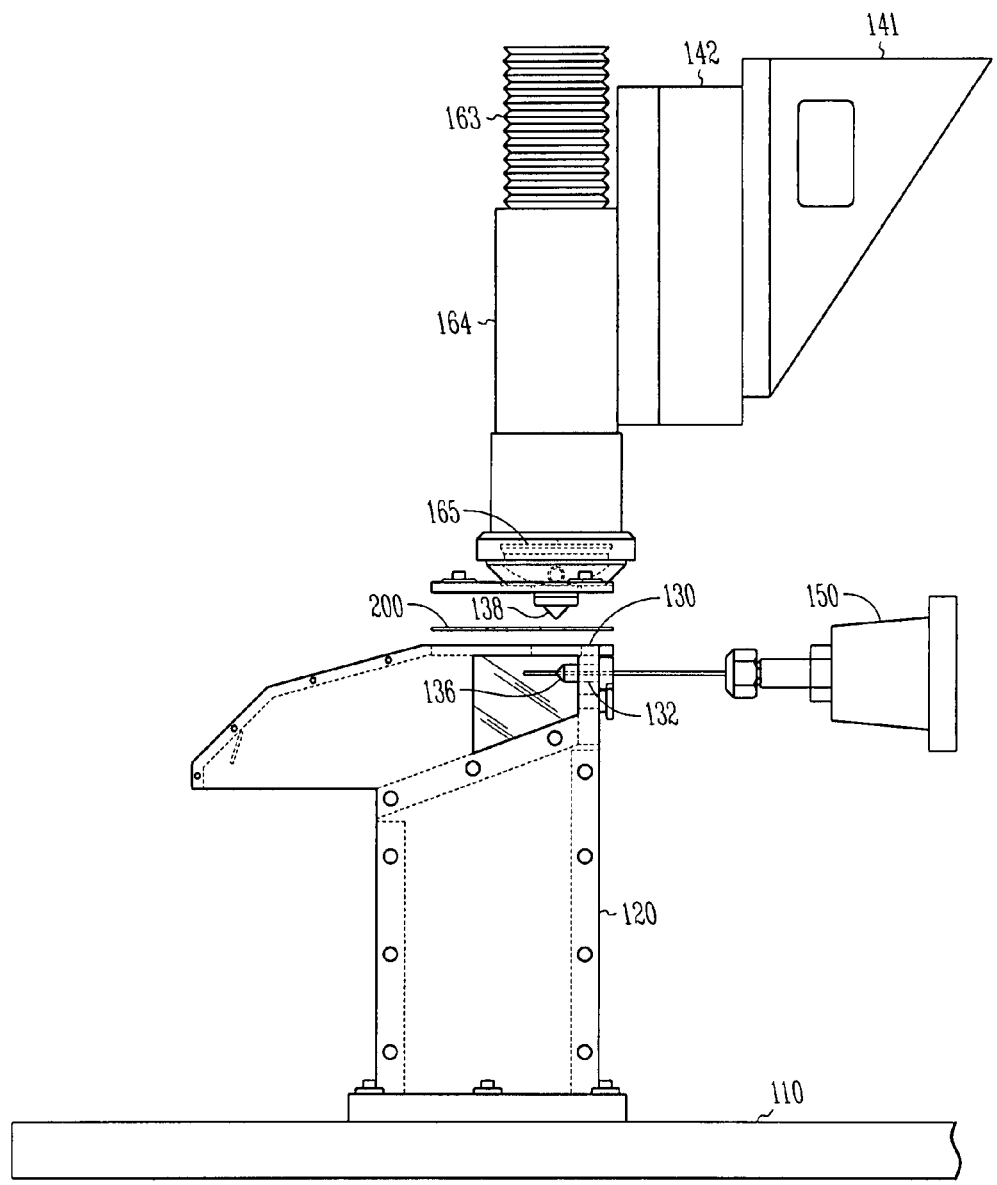
FIG. 6 is a side view of a tubing machining apparatus with the optical assembly or beam delivery system detached from the tooling block, according to an example embodiment of the invention.

FIG. 5 is a side view of a tubing machining apparatus 500 having the optical assembly 161 or beam delivery system attached to the main or guide bushing tooling block 130 and the frame 120, according to an example embodiment of the invention. FIG. 6 is a side view of a tubing machining apparatus 500 with the optical assembly or beam delivery system 160 detached from the main or guide bushing tooling block 130, according to an example embodiment of the invention. A spacer plate, such as spacer plate 200, is being inserted between the mating plate 140 (see FIG. 1) and the main or guide bushing tooling 130 to appropriately space the laser focusing element 165 and the focused laser cutting spot 170 with respect to the tubing material.

Now referring to both FIGS. 5 and 6, the retooling of the tubing machining apparatus 500, such as when a different diameter tubing material 501 is going to be changed for a particular machining operation, will be further discussed. During retooling it is necessary to change the spacing of the optical assembly with respect to the tubing 501. The tubing material 501 is held by the guide bushing 132 and the rotary drive bushing assembly 150. The position of the optical assembly 161 with respect to the tubing 501 is changed by adding, removing or changing spacer plates, such as spacer plate 200. Each of the spacer plates 200 is dimensioned to be exactly the same with respect to the openings in the spacer plate for the pins 220, 222 and for the fasteners 210, 212, 214 as well as for the gas jet and the laser beam. The openings 410, 412, 414, 420, 422 are oversized to allow the original pins and fasteners 210, 212, 214, 220, 222 to pass through the spacer plate 200. The pins and fasteners 210, 212, 214, 220, 222 attach to the mating plate 140 and to the main or guide bushing tooling 130 as before. The spacer plate 200 can be thought of as acting like a washer. The thickness T of the spacer plate 200 changes when the diameter of the tubing 501 is changed. The thickness T of the spacer plate changes so that the cutting location or the focused laser beam cutting point 170 can be shifted up or down so that the focused laser beam cutting point is on the periphery or appropriately positioned with respect to the tubing to effectuate cutting the tubing. It should be noted that at a minimum diameter of tubing material, there may be no need for a spacer plate. This is the case when the apparatus 100 was cutting tubing material 101, such as is shown in FIGS. 1-3 above.

During initial set up of the apparatus 100 for machining tubing 101, the rotary bushing assembly 150 is precisely aligned with the guide bushing 132. Once this alignment has been done, it is only on rare occasion that the rotary bushing assembly 150 needs to be realigned with the guide bushing 132. This substantially reduces the amount of time needed for retooling or changing the apparatus 100 so that it can handle a new diameter of tubing material, such as tubing material 501. In addition, because the alignment between the rotary bushing assembly 150 and the guide bushing 132 is done once, there is less room for error due to subsequent realignments. One error that can occur if the rotary bushing assembly 150 is slightly misaligned with respect to the guide bushing tooling 130 is the unintended application of torque on the tubing material 101, 501 which may result in a defective manufactured part.

Figure 7:
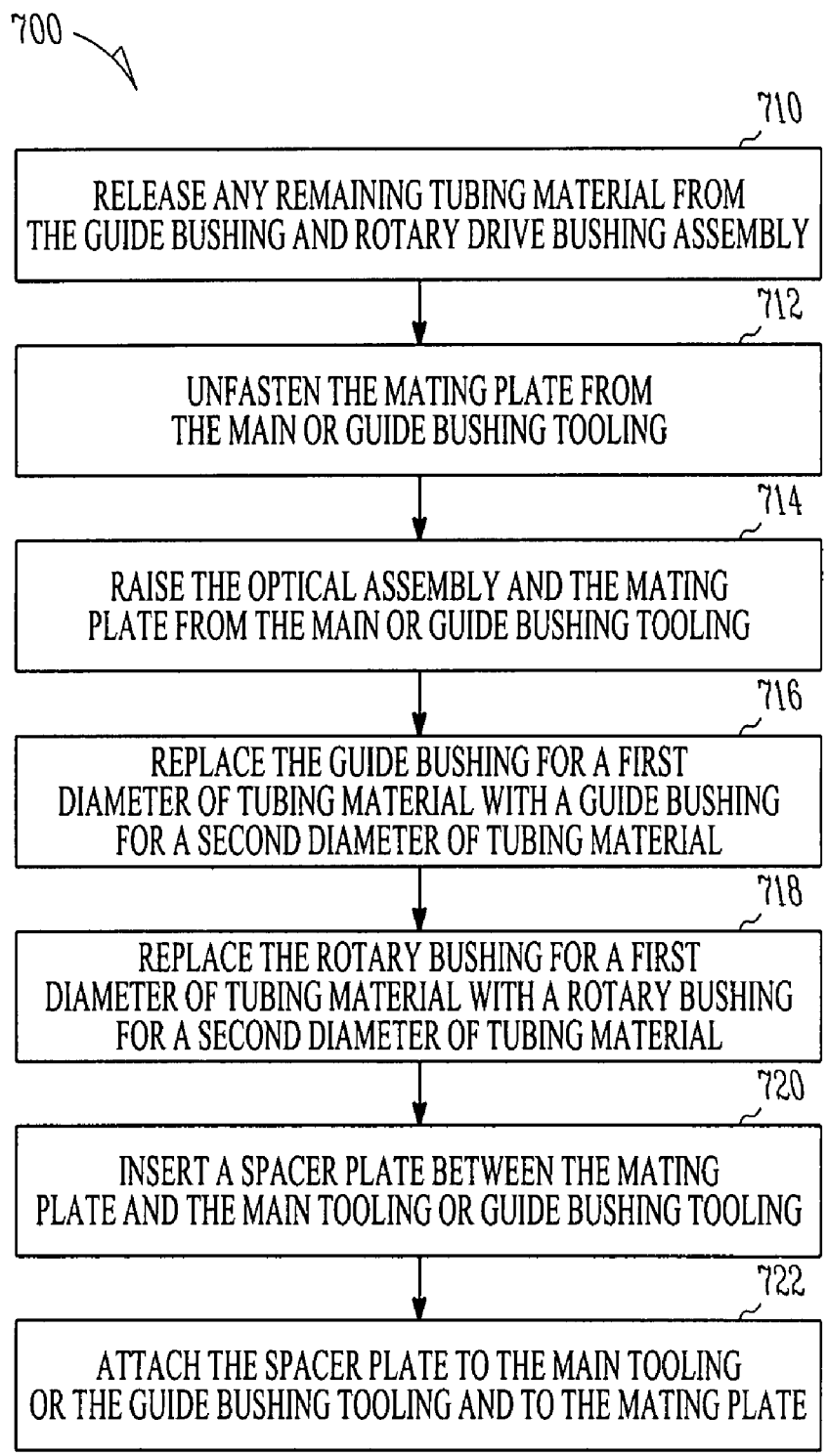
FIG. 7 is a flow diagram of a method for retooling a machine for cutting openings in a tubular structure, according to an example embodiment of the invention.

FIG. 7 shows a flowchart for a method 700 for retooling a machine for cutting openings in a tubular structure, according to an embodiment of this invention. The method 700 for retooling a machine for cutting openings in a tubular structure includes releasing any remaining the tubing material from the guide bushing and rotary drive bushing assembly 710, and unfastening the mating plate from the main or guide bushing tooling 712, and raising the optical assembly and the mating plate from the main or guide bushing tooling 714. Of course, unfastening the mating plate from the main or guide bushing tooling 712 includes removing the fasteners 210, 212, 214. The method 700 also includes replacing the guide bushing for a first diameter of tubing material with a guide bushing for a second diameter of tubing material 716, and replacing the rotary bushing for a first diameter of tubing material with a rotary bushing for a second diameter of tubing material 718. A spacer plate is then inserted between the mating plate and the guide bushing tooling, 720. The spacer plate has a thickness to correctly space the laser cutting point so as to allow the laser to cut the tubing material. It should be noted that in some instances, there may be times when another spacer plate must be removed before inserting a new spacer plate 720. This occurs when other than the minimum diameter tubing is being machined. The spacer plate is for spacing the optical assembly 161 an appropriate distance from the tubing having a second diameter tube material to effectuate cutting of the tubing material with the focused laser beam. In other words, the second spacer repositions the laser cutting point with respect to the second diameter of tubing material. The method 700 also includes attaching the spacer plate to the main tooling or the guide bushing tooling and to the mating plate, 722. The retooling operation is completed such that the opening in the guide bushing is aligned to the rotary drive bushing without realigning the rotary drive bushing to the guide bushing. In fact, the rotary guide bushing housing is not even moved.

As mentioned previously, this saves time since realigning the rotary drive bushing 150 to the second or new guide bushing 132 takes time. If there is less time devoted to retooling, there can be more time devoted to production. Therefore, various jobs can be accomplished faster. In addition, more time can be spent up front initially aligning the rotary drive bushing 150 to the guide bushing 132 so that these two bushings are very accurately aligned. In fact, removing the rotary drive bushing, which is actually housed inside the rotary drive bushing assembly 150 and the guide bushing 132 and aligning the cylindrical holes which house these bushings is the most accurate way of initially aligning the guide bushing tooling 130 to the rotary drive bushing tooling 150, since there can be slight deviations between the inner and outer diameters of cylindrical bushings. Thus, the products produced from the apparatus 100 are much less prone to defects that result from misalignment of the guide bushing 132 and the rotary drive bushing 150. It should also be noted that when the guide bushing 132 and the rotary drive bushing assembly 150 remain in alignment, there is little if any room for operator error in aligning the guide bushing 132 and the rotary drive bushing assembly 150 during retooling. In fact, the rotary and guide bushing housings are not even moved, the bushings are simply replaced, when changing tubing diameters.

The apparatus 100 may also include a number of spacer plates 200 (see FIG. 4) for positioning the optical assembly 161 with respect to the guide bushing 132 and the tubing material 101 for various diameters. The apparatus generally will have other spacer plates for positioning the optical assembly 161 (see FIG. 1) with respect to the guide bushing 132 for all the common diameters of tubing material, such as tubing material 101, 501. In addition, in some applications, several of the spacer plates may be stacked to provide the correct spacing.

Figure 8:
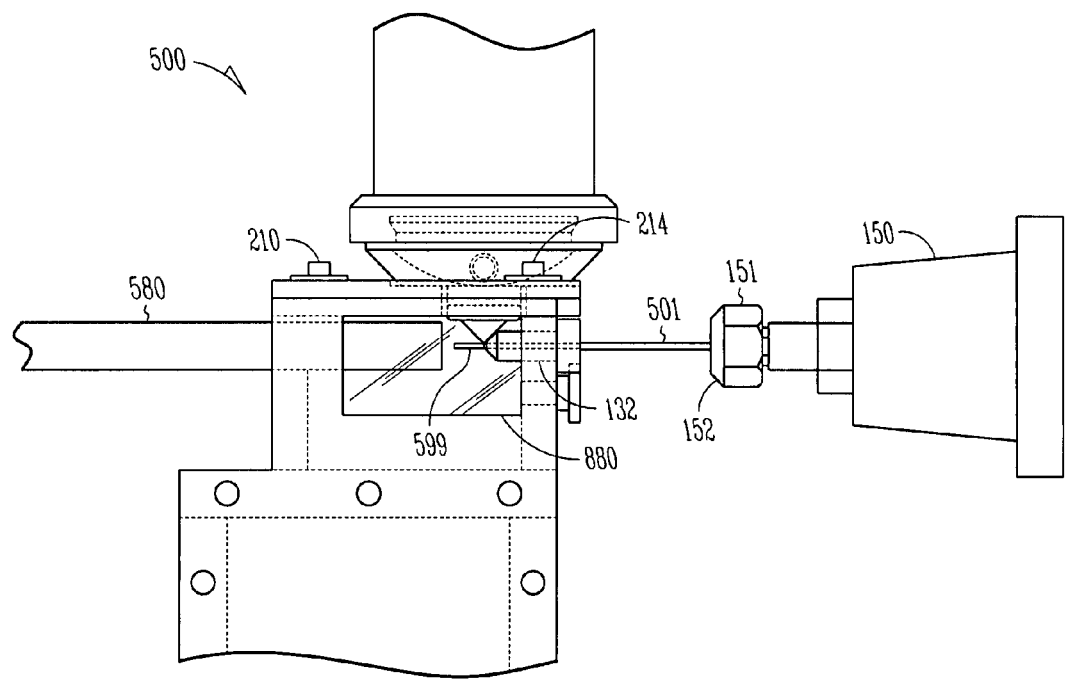
FIG. 8 is a side view of a tubing machining apparatus that includes an elongated ejection box for receiving long lengths of cut tubing, according to an example embodiment of the invention.

FIG. 8 is a side view of tubing machining apparatus 500 that includes an elongated ejection box 580 for receiving long lengths of cut tubing material 501, according to an example embodiment of the invention. Many of the elements of FIG. 8 are the same as the elements shown in previous FIGs. and therefore like elements carry the same reference numerals. The elongated ejection box 580 can be a tube which receives an elongated machined or finished part that comes from the tubing material 501. As shown, the apparatus 500 also includes the optical assembly 161, which is attached to the main or guide bushing tooling 130 by way of a spacer plate 200. The spacer plate 200 is attached to the guide bushing tooling by fasteners 210, 212 (not shown) and 214. The apparatus 500 also includes the guide bushing 132, which is attached to the frame 110. The apparatus 500 also includes the rotary driver bushing 150. The elongated tubing material 501 is positioned within the guide bushing 132 and the rotary drive bushing 150. The ejection box 580 also includes a clear window 880 in the sidewall of the ejection box 580. The clear material associated with the window 880 can be treated so that it filters out light associated with the laser. The window 880 is helpful in the event there is a need to inspect the product 599 or any part of the apparatus shown in FIG. 8.

Figure 9:
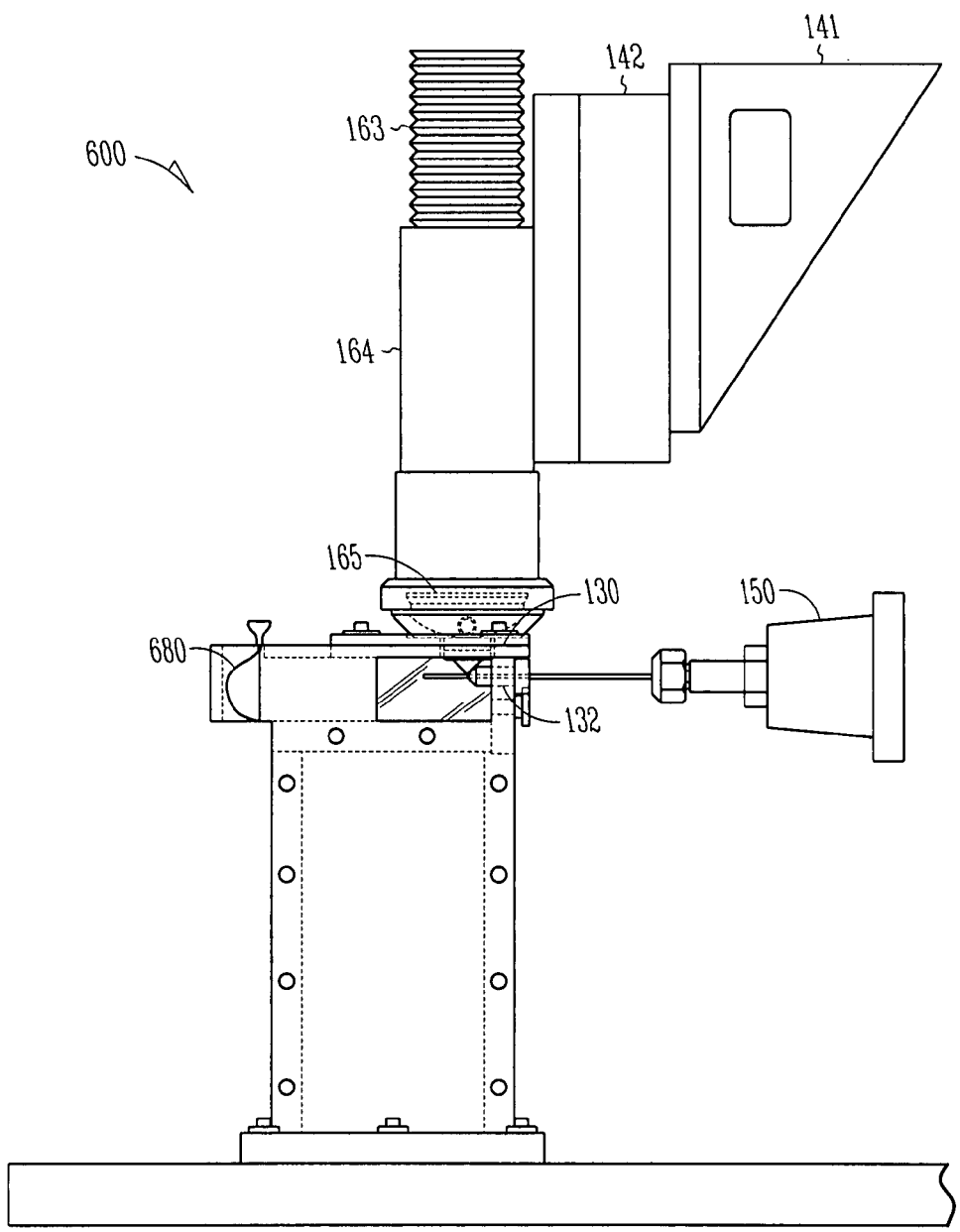
FIG. 9 is a side view of a tubing machining apparatus that includes a net for catching cut tubing, according to an example embodiment of the invention.

FIG. 9 is a side view of a tubing machining apparatus 600 that includes a net 680 for catching cut tubing material or finished product, according to an example embodiment of the invention. The net may be made of a soft polymer or a fiber free cloth. The net 680 is employed to protect finished parts, such as stents from ever having to hit a hard surface in an ejection box, such as ejection box 180 (shown in FIG. 1). When the cooling water stream shoots a finished part 182 (shown in FIG. 1) or a cut piece of tubing, such as a stent, out of the cutting area, the finished product hits the soft net. This further eliminates the possibility of defects due to dents, dings or bending of the finished part. The remaining portions of the tooling are similar to or the same as apparatus 100 (shown in FIGS. 1, 2 and 3) and the apparatus 500 (shown in FIGS. 5, 8). Therefore, to eliminate repetition, all of the same parts will not be discussed again here. Again, the main difference is the use of a net 680 rather than an ejection box 180 or an elongated ejection box 580.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments and other embodiments not specifically described herein will be apparent to those of skill in the art upon reviewing the above description.

The Abstract of the Disclosure is provided to comply with 37 C.F.R. §1.72(b) requiring an abstract that will allow the reader to quickly ascertain the nature of the technical disclosure. It is submitted with the understanding that it will not be used to interpret or limit the scope or meaning of the claims. In the foregoing Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into the Detailed Description, with each claim standing on its own as a separate embodiment.

What is claimed is:

1. An apparatus for machining tubing comprising:
a weighted base;
an upright frame attached to the weighted base;
a guide bushing tooling attached to the upright frame;
a first guide bushing configured to be held by the guide bushing tooling, the first guide bushing corresponding to a first tube diameter;
a second guide bushing configured to be held by the guide bushing tooling, the second guide bushing corresponding to a second tube diameter different from the first tube diameter;
a rotary drive bushing assembly aligned with the guide bushing tooling attached to the weight base,
a laser light source attached to the weighted base;
an optical assembly for focusing the laser light to a laser cutting spot, the optical assembly is adjacent to the guide bushing tooling;
a mating plate at the optical assembly and the guide bushing tooling, the mating plate engages the optical assembly and the guide bushing tooling at a location adjacent to the laser cutting spot, wherein the mating plate supports the optical assembly and holds the laser cutting spot static relative to the guide bushing tooling;
a spacer plate for spacing the laser cutting spot with respect to a tubing material of a first diameter, the spacer plate is configured for engagement between the optical assembly and the guide bushing tooling at the location adjacent to the laser cutting spot, and the spacer plate is configured to support the mating plate on at least two opposing sides of the mating plate with the optical assembly therebetween; and
an alignment and engagement assembly including at least the weighted base and the upright frame, the alignment and engagement assembly aligns the guide bushing with the rotary drive bushing assembly along a static axis and maintains the alignment in at least first and second tubing configurations:
in the first tubing configuration the alignment and engagement assembly aligns the first guide bushing coupled with the guide bushing tooling with the rotary drive bushing assembly along the static axis for the first tube diameter, and
in the second tubing configuration the alignment and engagement assembly maintains the alignment of the second guide bushing with the guide bushing tooling with the rotary drive bushing assembly along the static axis for the second tube diameter.

2. The apparatus of claim 1 wherein the upright frame includes a cavity adapted to receive additional material for weighting the upright frame member.

3. The apparatus of claim 1 wherein the optical assembly is movably mounted to allow translation of the optical assembly with respect to the guide bushing tooling.

4. The apparatus of claim 1 wherein the laser light source and the optical assembly for focusing the laser light source produces the laser cutting spot and wherein the rotary bushing can be positioned with respect to the guide bushing at a distance within a range of 0.005" to 24.005".

5. The apparatus of claim 1 wherein the laser light source and the optical assembly for focusing the laser light source produces the laser cutting spot and wherein the rotary bushing can be positioned with respect to the guide bushing at a distance within a range of 0.010" to 24.010".

6. The apparatus of claim 1 wherein the laser light source and the optical assembly for focusing the laser light source produces the laser cutting spot and wherein the rotary bushing can be positioned with respect to the guide bushing at a distance within a range of 0.025" to 24.025".

7. The apparatus of claim 1 wherein the optical assembly for focusing the laser light is attached to the weighted base.

8. The apparatus of claim 1 further comprising an ejection box attached to the base, the ejection box adapted to catch manufactured parts, wherein the ejection box includes a side having a substantially curved surface.

9. The apparatus of claim 1 further comprising an ejection box attached to the base, the ejection box adapted to catch manufactured parts, wherein the ejection box includes a substantially curved surface for deflecting the manufactured parts.

10. The apparatus of claim 1 further comprising an ejection box attached to the base, the ejection box further including a net adapted to catch machined parts.

11. The apparatus of claim 1 further comprising an ejection box having a frame attached to the base, the ejection box having at least one substantially clear window portion.

12. The apparatus of claim 11, wherein the ejection box includes a clear window portion that substantially blocks a certain wavelength of light.

13. The apparatus of claim 1 wherein the laser light source includes a beam delivery system, the beam delivery system pinned to the guide bushing tooling through the mating plate engaged between the optical assembly and the guide bushing tooling.

14. The apparatus of claim 1 further comprising:
a first spacer plate for spacing the laser cutting spot with respect to a tubing material of a first diameter, the first spacer plate is configured for engagement between the optical assembly and the guide bushing tooling at the location adjacent to the laser cutting spot; and
a second spacer plate for spacing the laser cutting spot with respect to a tubing material of a second diameter different from the first diameter, the second spacer plate is configured for engagement between the optical assembly and the guide bushing tooling at the location adjacent to the laser cutting spot.

15. The apparatus of claim 1 wherein the laser beam and the optical assembly for focusing the laser beam produces a laser cutting spot and wherein the guide bushing can be positioned with respect to the focused laser beam at a distance within a range of 0.015" to 0.400".

16. The apparatus of claim 1 wherein the laser beam and the optical assembly for focusing the laser beam produces a laser cutting spot and wherein the guide bushing can be positioned with respect to the focused laser beam at a distance within a range of 0.025" to 0.400".

17. The apparatus of claim 1 wherein the laser beam and the optical assembly for focusing the laser beam produces a laser cutting spot and wherein the guide bushing can be positioned with respect to the focused laser beam at a distance within a range of 0.035" to 0.400".

18. The apparatus of claim 1, wherein the guide bushing is substantially flush with respect to the guide bushing tooling.

19. The apparatus of claim 1, wherein the rotary bushing assembly includes a chamfer to allow the rotary drive bushing to be positioned substantially adjacent the guide bushing.

20. The apparatus of claim 1, wherein the mating plate is fastened to the guide bushing tooling.

21. The apparatus of claim 20, wherein the mating plate is engaged with the upright frame.

22. The apparatus of claim 1, wherein the alignment and engagement assembly maintains the alignment along the static axis in at least the first and second tubing configurations without realigning either of the guide bushing tooling or the rotary drive bushing assembly.

23. The apparatus of claim 1, wherein the alignment and engagement assembly includes the mating plate, the mating plate engages the optical assembly with the guide bushing tooling at the location adjacent to the laser cutting spot in the first and second tubing configurations, and:
the mating plate provides direct static engagement immediately between the optical assembly and the guide bushing tooling, and
the weighted base and the upright frame provide direct static engagement between the guide bushing tooling and the rotary drive bushing assembly.

24. The apparatus of claim 23, wherein the mating plate and the spacer plate cooperate to engage the optical assembly with the guide bushing tooling at the location adjacent to the laser cutting spot when interposed therebetween;
in the first tubing configuration the alignment and engagement assembly with the mating plate holds the laser cutting spot at a first tube perimeter corresponding with the first tube diameter; and
in the second tubing configuration the alignment and engagement assembly with the mating plate and the at least one spacer plate holds the laser cutting spot at a second tube perimeter corresponding with the second tube diameter.

25. The apparatus of claim 24, wherein the mating plate and the spacer plate include dowel openings that align with dowel pins, the dowel pins are coupled with the guide bushing tooling and laterally fix the mating plate, spacer plate and the optical assembly relative to the guide bushing tooling, the upright frame and the weighted base.

26. The apparatus of claim 1, wherein the mating plate includes a first plate surface engaged with the optical assembly and a second face engaged with the guide bushing tooling.

* * * * *